(12) United States Patent
Sun

(10) Patent No.: US 7,130,133 B2
(45) Date of Patent: Oct. 31, 2006

(54) LENS HAVING WAVELIKE LENS ELEMENT

(75) Inventor: Wen-Hsin Sun, Tu-Cheng (TW)

(73) Assignee: HON HAI Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/115,461

(22) Filed: Apr. 26, 2005

(65) Prior Publication Data

US 2005/0264897 A1 Dec. 1, 2005

(30) Foreign Application Priority Data

May 28, 2004 (TW) .............................. 93208421 U

(51) Int. Cl.
- G02B 13/18 (2006.01)
- G02B 3/02 (2006.01)
- G02B 9/14 (2006.01)

(52) U.S. Cl. ...................................... 359/716; 359/789

(58) Field of Classification Search ................ 359/708, 359/716, 738, 739, 784, 785, 789
See application file for complete search history.

(56) References Cited

U.S. PATENT DOCUMENTS

| 6,844,989 B1* | 1/2005 | Jo et al. ...................... 359/716 |
| 6,970,306 B1* | 11/2005 | Matsuo ........................ 359/716 |
| 6,977,779 B1* | 12/2005 | Shinohara .................... 359/716 |
| 2003/0029332 A1* | 2/2003 | Matsuzuki et al. ........... 100/92 |
| 2004/0246598 A1* | 12/2004 | Amanai ....................... 359/784 |

FOREIGN PATENT DOCUMENTS

CN 2511990 Y 9/2002

\* cited by examiner

*Primary Examiner*—Alicia M Harrington
(74) *Attorney, Agent, or Firm*—Tim Tingkang Xia; Morris Manning & Martin

(57) ABSTRACT

A lens that can be used in a digital camera includes in sequence a first lens element (20), a second lens element (30) and a third lens element (40). The first lens element is biconvex, and includes a first aspheric surface (22) and a second aspheric surface (24). The second lens is concavo-convex, and includes a third aspheric surface (32) and a fourth aspheric surface (34). The third lens includes a wavelike fifth aspheric surface (42) and a wavelike sixth aspheric surface (44). All of the lens elements are made of glass. The lens has a compact volume, and provides stable imaging performance and good image quality.

20 Claims, 3 Drawing Sheets

LENS HAVING WAVELIKE LENS ELEMENT

FIELD OF THE INVENTION

The present invention generally relates to lenses for devices such as digital cameras, and more particularly to a lens that has lens elements with aspheric surfaces.

BACKGROUND OF THE INVENTION

Digital cameras utilizing high-resolution electronic imaging sensors typically require high resolution optical components such as lenses. In addition, the lenses generally must be very compact, so that they can be incorporated into devices such as palm-sized computers, cellular telephones, and the like.

Lenses for digital cameras generally have several individual lens elements. The lens elements are typically spherical, and usually create spherical aberration. Chromatic aberration, coma, distortion, and field curvature are also common optical aberrations that occur in the imaging process of a typical lens. A large number of lens elements are generally required in order to balance the inherent optical aberrations. Lenses having a large number of lens elements tend to be large, heavy, and expensive to manufacture. The large number of lens elements increases material costs, and increases the cost of assembling and mounting the lens elements into the lens cell.

Further, conventional lenses commonly use one or more aspheric lens elements, each of which has one or two non-spherical surfaces. The aspheric lens elements are made of plastic or glass. Aspheric plastics lens elements may be produced by means of plastic injection molding, and are therefore relatively inexpensive. However, the optical characteristics of most plastics lens elements change with changes in temperature and humidity, such as when the digital camera is used outdoors on very hot or very cold days. Furthermore, the hardness of optical plastic material is lower than that of optical glass material. The surfaces of such lens elements are easily scraped or abraded, which affects the precision of imaging. In comparison, glass aspheric lens elements have good optical properties and are less easily scraped or abraded. However, glass aspheric lenses generally cannot be easily produced by traditional glass grinding and polishing techniques. It is only in relatively recent times that glass aspheric lenses have been able to be produced through molding glass methods.

A typical lens having both spherical lens elements and aspheric lens elements is disclosed in China Patent Number 01272836. The lens includes a first spherical lens element, a second aspheric lens element, and a third lens element. The first lens element is biconvex, and is made of glass. The second lens element is biconcave, and is made of plastic. The third lens element has a lens surface convex to the object side of the lens, and is made of plastic. Although the second plastic aspheric lens element decreases the overall weight of the lens, the performance of the lens can easily change with changes in temperature. In addition, changes in humidity may also reduce the image quality.

Accordingly, what is needed is a lens for a digital camera which is compact and which provides stable and good quality imaging.

SUMMARY

A lens for digital camera of a preferred embodiment consecutively comprises: a first lens element being biconvex, and including a first aspheric surface and a second aspheric surface; a second lens element being concavo-convex, and including a third aspheric surface and a fourth aspheric surface; and a third lens including a fifth aspheric surface and a sixth aspheric surface, the fifth aspheric surface and the sixth aspheric surface being wavelike. All of the lens elements are made of glass.

Other objects, advantages and novel features of the invention will become more apparent from the following detailed description when taken in conjunction with the accompanying drawings, in which:

DETAILED DESCRIPTION OF THE PREFERRED EMBODIMENT

Figure 1:
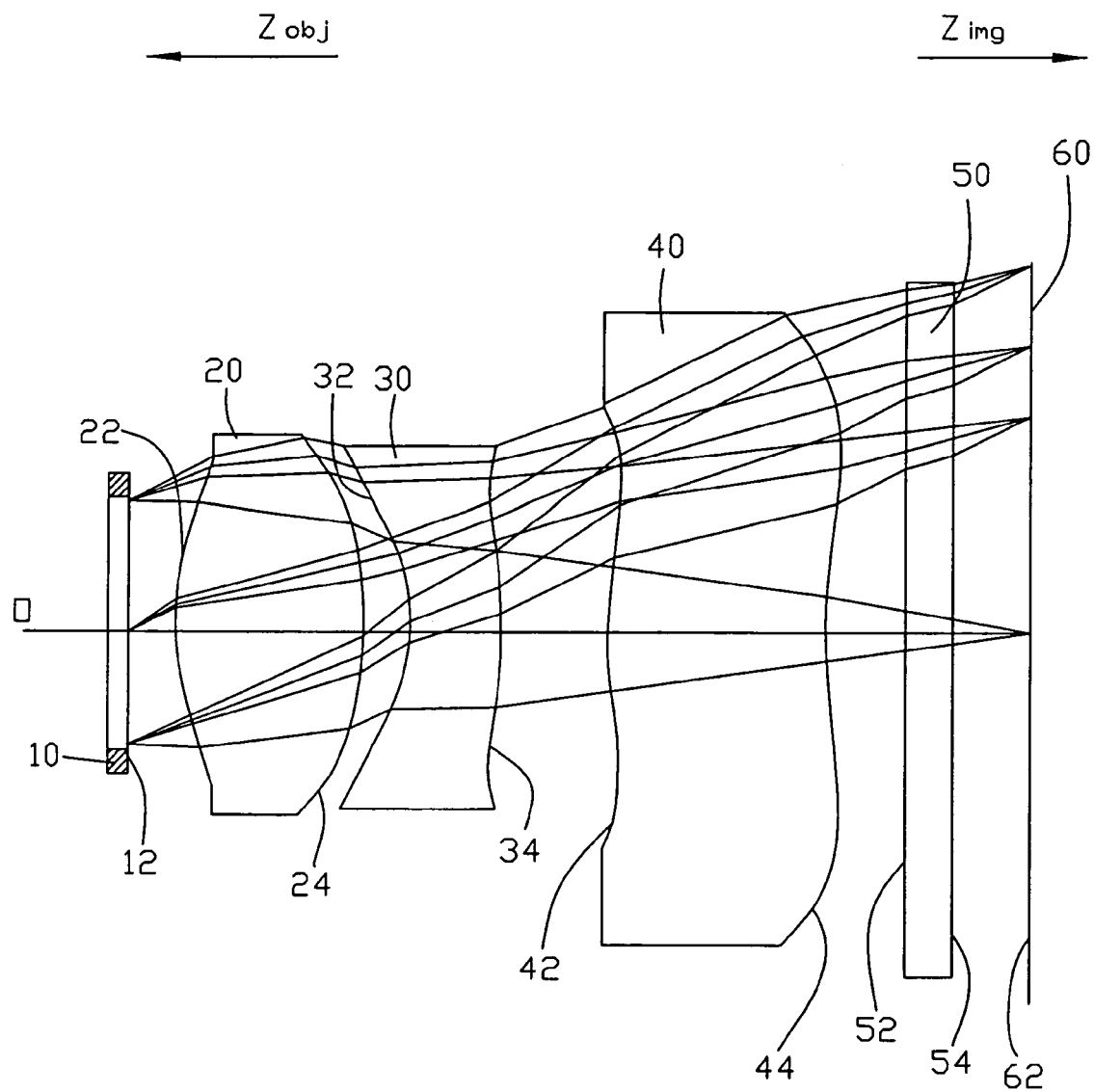
FIG. 1 is a schematic, side cross-sectional view of a lens for a digital camera according to a preferred embodiment of the present invention.

Referring to FIG. 1, a digital camera module of an image acquiring device of the preferred embodiment includes an aperture stop 10, a lens set having a first lens element 20, a second lens element 30 and a third lens element 40, an optical board 50 and an imaging sensor 60, which are consecutively arranged in that order from an object side designated as "$Z_{obj}$" to an image side designated as "$Z_{img}$". An "O" line represents an optical axis of the lens.

The aperture stop 10 includes a stop plane 12, which faces the first lens element 20. The aperture stop 10 is the first component to receive light rays when the lens is used. Therefore, it is convenient to control the light rays using the aperture stop 10.

The first lens element 20 is biconvex, and includes a first surface 22 and a second surface 24. The second lens element 30 is concavo-convex, and includes a third surface 32 and a fourth surface 34. The third lens element 40 includes a fifth surface 42 and a sixth surface 44, with configurations of the fifth and sixth surfaces 42, 44 being wavelike. All of the lens elements 20, 30, 40 are aspheric, and are symmetrically disposed about the O line respectively.

All of the lens elements 20, 30, 40 are made of optical glass. A refractive index designated as "n" and a dispersion coefficient designated as "v" of the first lens element 20 need to satisfy the following requirements: $1.5<n<1.6$, $55<v<66$. The first lens element 20 is preferably made from L-BAL42. The refractive index of L-BAL42 is 1.58313, and its dispersion coefficient is 59.4. A refractive index and dispersion coefficient of the second lens element 30 need to satisfy the following requirements: $1.65<n<1.75$, $25<v<35$. The second lens element 30 is preferably made from L-TIM28. The refractive index of L-TIM28 is 1.68893, and its dispersion coefficient is 31.1. A refractive index and dispersion coefficient of the third lens element 40 need to satisfy the following requirements: $1.65<n<1.75$, $50<v<60$. The third lens element 40 is preferably made from L-LAL13. The refractive index of L-LAL13 is 1.6935, and its dispersion coefficient is 53.2.

The optical board 50 is made of glass, and includes a first plane 52 and a second plane 54. The optical board 50 is preferably made from B270. The refractive index of B270 is 1.52308, and its dispersion coefficient is 58.57.

At least one surface of the first lens element 20, the second lens element 30, the third lens element 40 and the optical board 50 is coated an Infrared-cut (IR-cut) coating. The IR-cut coating can filter infrared rays and hence improving image quality.

The image sensor 60 is located at the image side of the optical board 50. The image sensor 60 includes an image plane 62. The optical board 50 can protect the image plane 62 of the image sensor 60, so that dust or other contamination does not reach the image plane 62. The image sensor 60 is usually a Charge Coupled Device (CCD) or a Complementary Metal Oxide Semiconductor (CMOS). If the image sensor 60 is used in a digital camera of a mobile phone, the image sensor 60 is usually a CMOS for cost reasons. A pixel size of the CMOS of the present embodiment is 3.18 μm, and a resolution of the CMOS is about 1280×960 pixels.

Detailed structural parameters of the preferred embodiment of the lens are shown in FIG. 1 and provided in Table 1. Surface radiuses and axial distances are shown in millimeters. The surfaces are identified according to the corresponding drawing reference, from the object side to the image side as shown.

TABLE 1

| Surface | Description | Radius (R) | Thickness (d) | Material | Diameter | Constant (k) |
|---|---|---|---|---|---|---|
| 12 | Stop plane | ∞ | 0.3368858 | | 1.717571 | 0 |
| 22 | First aspheric surface | 2.233335 | 1.341358 | L-BAL42 | 2.350368 | 0 |
| 24 | Second aspheric surface | −4.047142 | 0.3481508 | | 2.653686 | 0 |
| 32 | Third aspheric surface | −1.448204 | 0.648517 | L-TIM28 | 2.504707 | 0 |
| 34 | Fourth aspheric surface | −5.082457 | 0.7580749 | | 2.534274 | 0 |
| 42 | Fifth aspheric surface | 3.312555 | 1.535315 | L-LAL13 | 3.137198 | 0 |
| 44 | Sixth aspheric surface | 3.976625 | 0.5495617 | | 4.456284 | 0 |
| 52 | First plane | ∞ | 0.3164125 | B270 | 4.804371 | 0 |
| 54 | Second plane | ∞ | 0.5787164 | | 4.88615 | 0 |
| 62 | Image plane | ∞ | | | 5.150428 | 0 |

In Table 1, R is radius of the surface, and d is the on-axis surface spacing. Accordingly, a thickness of the first lens element 20 is determined by the thickness of the first aspheric surface minus that of the second aspheric surface. That is, the thickness of the first lens element 20 is 1.341358 mm–0.3481508 mm which is approximately 0.99 mm. A thickness of the second lens element 30 is approximately 0.11 mm (0.7580749 mm–0.648517 mm). A thickness of the third lens element 40 is approximately 0.99 mm (1.535315–0.5495617). A distance between the first lens element 20 and the second lens element 30 is approximately 0.30 mm (0.648517 mm–0.3481508 mm). A distance between the second lens element 30 and the third lens element 40 is approximately 0.78 mm (1.535315 mm–0.7580749 mm).

The aspheric surfaces are the surfaces 22, 24, 32, 34, 42 and 44, and describe the following equation:

$$z = \frac{cr^2}{1+\sqrt{1-(1+k)c^2r^2}} + a_1 r^2 + a_2 r^4 + a_3 r^6 + a_4 r^8 + a_5 r^{10} + a_6 r^{12} \ldots$$

Where:
Z is the surface sag;
C=1/R, where R is the radius of the surface;
K is the conic constant;
r is the distance from the optical axis; and
$a_1$, $a_2$, $a_3$, $a_4$, $a_5$, and $a_6$ are the aspheric coefficients.

The aspheric coefficients $a_1$, $a_2$, $a_3$, $a_4$, $a_5$, and $a_6$ are given by Table 2:

TABLE 2

| Surface | Description | $a_1$ | $a_2$ | $a_3$ | $a_4$ | $a_5$ |
|---|---|---|---|---|---|---|
| 22 | First aspheric surface | 0 | −0.008736287 | −0.017037427 | 0.01286038 | −0.011864836 |
| 24 | Second aspheric surface | 0 | −0.097374295 | 0.030868786 | −0.014535324 | 0.0021773111 |
| 32 | Third aspheric surface | 0 | −0.10229721 | 0.26279385 | −0.14958795 | 0.04103175 |
| 34 | Fourth aspheric surface | 0 | −0.089026993 | 0.15340881 | −0.064886346 | 0.013833151 |
| 42 | Fifth aspheric surface | 0 | −0.10201444 | 0.023702697 | −0.0044555483 | −0.00030694477 |
| 44 | Sixth aspheric surface | 0 | −0.058282397 | 0.0080708413 | −0.0011444392 | 0.000046453872 |

The effective focal length of the lens is 4.809 mm in air, and the maximum aperture is f/2.8. The field of view is 55.76 degrees. The lens is well suited for use with state-of-the-art digital sensors having a resolution about 1280×960 pixels.

The performance of the lens of the preferred embodiment is illustrated in FIG. 2 through FIG. 5.

Figure 2:
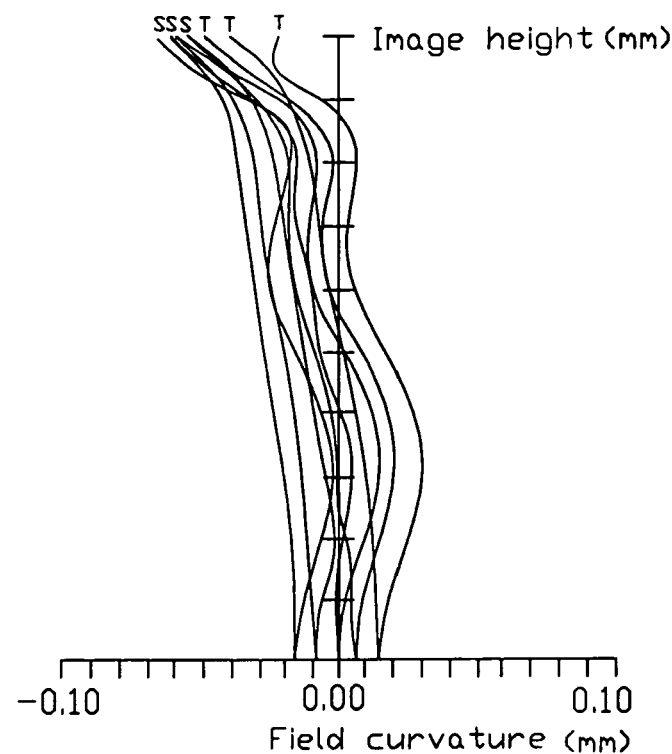
FIG. 2 is a graph of tangential and sagittal field curvatures of the lens of FIG. 1.

Referring to FIG. 2, field curvature represents the curved extents of the image plane when visible light is focused through a lens. Field curvature is very seldom totally eliminated. It is not absolutely necessary to have the best correction. When cost is important, it is often wise to select a more modestly priced configuration, rather than have a high degree of correction. For the lens, it can be seen that the tangential and sagittal field curvature is under ±0.1 mm.

Figure 3:
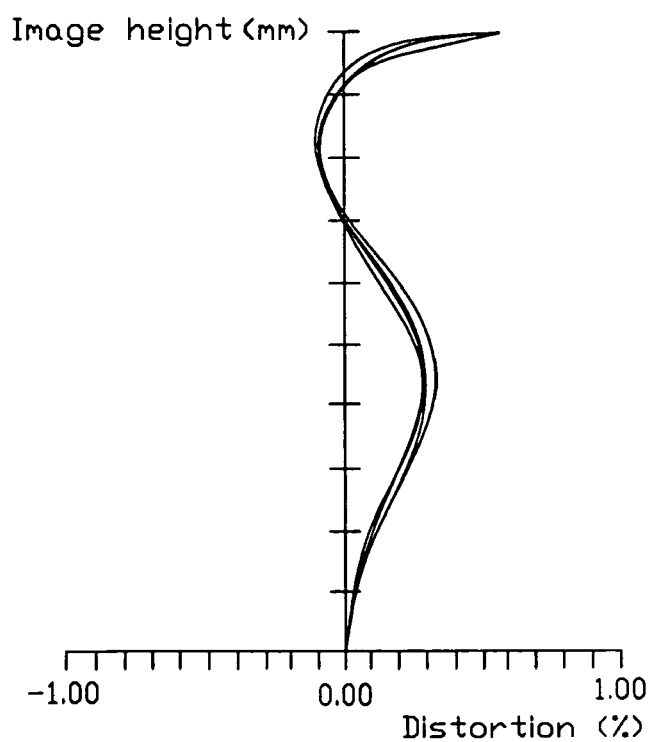
FIG. 3 is a graph of optical distortion of the lens of FIG. 1.

Referring to FIG. 3, distortion represents the inability of a lens to create a rectilinear image of the subject. Distortion does not modify the colors or the sharpness of the image, but rather the shape of the image. The maximum geometric distortion of the lens is typically higher than −1%, and lower than +1%. The lens can provide crisp and sharp images with minimal field curvature, and is considered to be sufficient for over 90 percent of photography applications.

Figure 4:
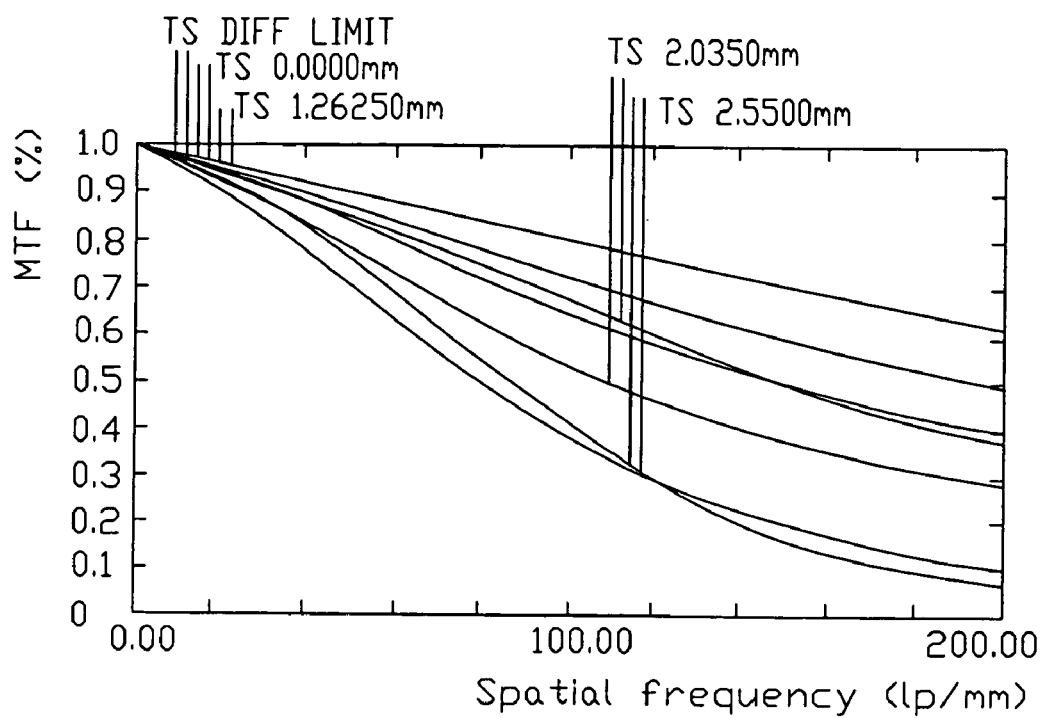
FIG. 4 is a graph of Modulation Transfer Function (MTF) of the lens of FIG. 1.
Figure 5:
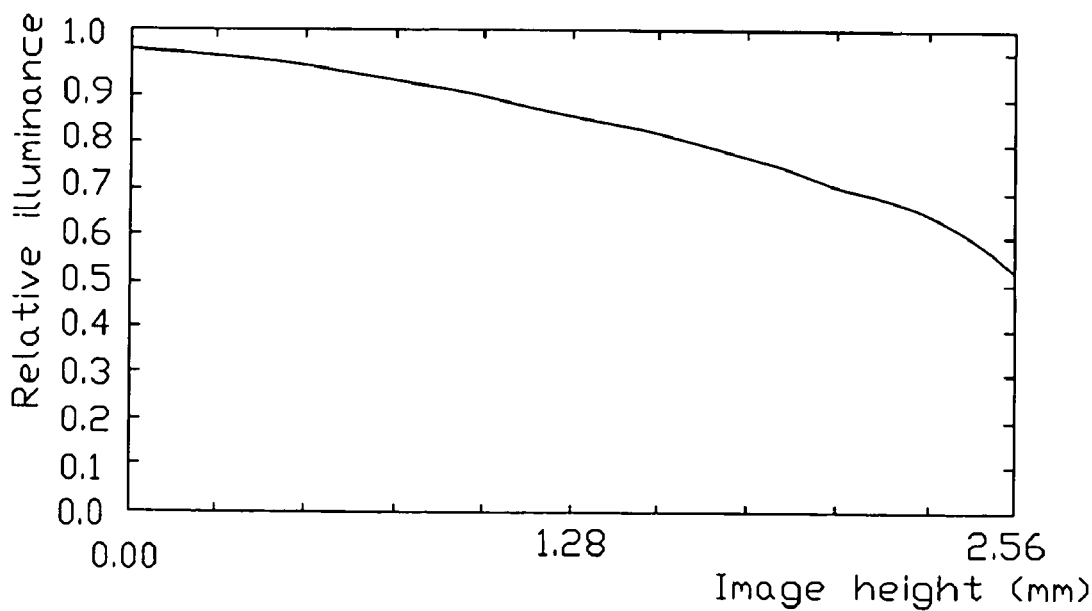
FIG. 5 is a graph of relative illuminance of the lens of FIG. 1.

Referring to FIG. 4, Modulation Transfer Function (MTF) is the scientific means of evaluating the fundamental spatial resolution performance of an imaging system. When MTF is measured, an imaging height is divided into 1.0, 0.8, 0.6, and 0 fields. For each field, the MTF is measured. Each curved line represents the performance of the lens. The higher the modulation transfer, the better the preservation of detail by the imaging system. When the spatial frequency is 100 lp/mm, the MTF is higher than 40%. This is considered satisfactory for general imaging requirements. Referring to FIG. 5, the lowest value of the relative illuminance is about 53%. Usually when the value of relative illuminance is higher than 50%, it is considered satisfactory for general requirements.

The lens may be used in various digital camera applications, including in personal digital cameras and other very small electronic devices.

While certain specific relationships, materials and other parameters have been detailed in the above description of preferred embodiments, the described embodiments can be varied, where suitable, within the principles of the present invention. It should be understood that the preferred embodiments have been presented by way of example only and not by way of limitation. Thus the breadth and scope of the present invention should not be limited by the above-described exemplary embodiments, but should be defined according to the following claims and their equivalents.

I claim:

1. A lens set for a digital camera, comprising:
    a first lens element being biconvex, and comprising a first aspheric surface and a second aspheric surface;
    a second lens element being concavo-convex, and comprising a third aspheric surface and a fourth aspheric surface; and
    a third lens element comprising a fifth aspheric surface and a sixth aspheric surface, the fifth and sixth aspheric surfaces being wavelike;
    wherein all of the lens elements are made of glass, and a refractive index 'n' of each of the second lens element and the third lens element satisfies the following requirement:1.65<n<1.75.

2. The lens set for a digital camera as claimed in claim 1, wherein a refractive index 'n' and a dispersion coefficient 'v' of the first lens element respectively satisfy the following requirements: 1.5<n<1.6, 55<v<65.

3. The lens set for a digital camera as claimed in claim 2, wherein a material of the first lens element comprises L-BAL42, the refractive index of L-BAL42 is 1.58313, and the dispersion coefficient of L-BAL42 is 59.4.

4. The lens set for a digital camera as claimed in claim 3, wherein a dispersion coefficient 'v' of the second lens element satisfies the following requirement: 25<v<35.

5. The lens set for a digital camera as claimed in claim 4, wherein a material of the second lens element comprises L-TIM28, the refractive index of L-TIM28 is 1.68893, and the dispersion coefficient of L-TIM28 is 31.1.

6. The lens set for a digital camera as claimed in claim 5, wherein a dispersion coefficient 'v' of the third lens element satisfies the following requirement: 50<v<60.

7. The lens set for a digital camera as claimed in claim 6, wherein a material of the third lens element comprises L-LAL13, the refractive index of L-LAL13 is 1.6935, and the dispersion coefficient of L-LAL13 is 53.2.

8. The lens set for a digital camera as claimed in claim 1, further comprising an optical board behind the third lens element, wherein the optical board is coated with an Infrared-cut (IR-cut) coating, a refractive index of the optical board is 1.52308, and a dispersion coefficient of the optical board is 58.57.

9. The lens set for a digital camera as claimed in claim 1, wherein at least one surface of the first lens element, the second lens element and the third element is coated with an Infrared-cut (IR-cut) coating.

10. The lens set for a digital camera as claimed in claim 1, wherein an effective focal length of the lens set is 4.809, and a field of view of the lens set is 55.76 degrees.

11. The lens set for a digital camera as claimed in claim 1, wherein a center thickness of the first lens element is approximately 0.99 mm, a center thickness of the second lens element is approximately 0.11 mm, a center thickness of the third lens element is approximately 0.99 mm.

12. The lens set for a digital camera as claimed in claim 1, wherein a distance between the first lens element and the second lens element is approximately 0.30 mm, a distance between the second lens element and the third lens element is approximately 0.78 mm.

13. The lens set for a digital camera as claimed in claim 1, wherein the lens set satisfies the following data:

| Description | Radius (R) | Thickness (d) | Material | Diameter | Conic Constant (k) |
|---|---|---|---|---|---|
| First aspheric surface | 2.233335 | 1.341358 | L-BAL42 | 2.350368 | 0 |
| Second aspheric surface | −4.047142 | 0.3481508 | | 2.653686 | 0 |
| Third aspheric surface | −1.448204 | 0.648517 | L-TIM28 | 2.504707 | 0 |

-continued

| Description | Radius (R) | Thickness (d) | Material | Diameter | Conic Constant (k) |
|---|---|---|---|---|---|
| Fourth aspheric surface | −5.082457 | 0.7580749 | | 2.534274 | 0 |
| Fifth aspheric surface | 3.312555 | 1.535315 | L-LAL13 | 3.137198 | 0 |
| Sixth aspheric surface | 3.976625 | 0.5495617 | | 4.456284 | 0. |

14. A module for a digital camera, consecutively comprising:

an aperture stop;

a lens set for a digital camera disposed behind the aperture stop, comprising:

a first lens element being biconvex, the first lens element comprising a first surface and a second surface; a second lens element being concavo-convex, the second lens element comprising a third surface and a fourth surface; and a third lens element, the third lens element comprising a wavelike fifth surface and a wavelike sixth surface; wherein all of the lens elements are made of glass, and a refractive index 'n' of each of the second lens element and the third lens element satisfies the following requirement: $1.65 < n < 1.75$;

an optical board disposed behind to third lens, and including a first plane and a second plane; and an image sensor, the image sensor being disposed behind the optical board and including an image plane.

15. The module for a digital camera as claimed in claim 14, wherein the aperture stop includes a stop plane, each of the first through sixth surfaces comprises an aspheric surface, and the aperture stop, lens set, optical board and image sensor satisfy the following data:

| Surface | Description | Radius (R) | Thickness (d) | Material | Diameter | Constant (k) |
|---|---|---|---|---|---|---|
| 12 | Stop plane | ∞ | 0.3368858 | | 1.717571 | 0 |
| 22 | First aspheric surface | 2.233335 | 1.341358 | L-BAL42 | 2.350368 | 0 |
| 24 | Second aspheric surface | −4.047142 | 0.3481508 | | 2.653686 | 0 |

-continued

| Surface | Description | Radius (R) | Thickness (d) | Material | Diameter | Constant (k) |
|---|---|---|---|---|---|---|
| 32 | Third aspheric surface | −1.448204 | 0.648517 | L-TIM28 | 2.504707 | 0 |
| 34 | Fourth aspheric surface | −5.082457 | 0.7580749 | | 2.534274 | 0 |
| 42 | Fifth aspheric surface | 3.312555 | 1.535315 | L-LAL13 | 3.137198 | 0 |
| 44 | Sixth aspheric surface | 3.976625 | 0.5495617 | | 4.456284 | 0 |
| 52 | First plane | ∞ | 0.3164125 | B270 | 4.804371 | 0 |
| 54 | Second plane | ∞ | 0.5787164 | | 4.88615 | 0 |
| 62 | Image plane | ∞ | | | 5.150428 | 0 | wherein the aspheric surfaces of the first, second, and third lens elements are defined by the equation, $$z = \frac{cr^2}{1 + \sqrt{1 - (1+k)c^2 r^2}} + a_1 r^2 + a_2 r^4 + a_3 r^6 + a_4 r^8 + a_5 r^{10} + a_6 r^{12} \ldots$$

where:

Z is the surface sag;

$C = 1/R$, where R is the radius of the surface;

K is the conic constant;

r is the distance from an optical axis of the respective lens element; and $a_1, a_2, a_3, a_4, a_5,$ and $a_6$ are aspheric coefficients of the conic and aspheric surfaces of the first, second, and third lens elements; and surface data for the first, second, and third lens elements are as follows:

| Surface | Description | $a_1$ | $a_2$ | $a_3$ | $a_4$ | $a_5$ |
|---|---|---|---|---|---|---|
| 22 | First aspheric surface | 0 | −0.008736287 | −0.017037427 | 0.01286038 | −0.011864836 |
| 24 | Second aspheric surface | 0 | −0.097374295 | 0.030868786 | −0.014535324 | 0.0021773111 |
| 32 | Third aspheric surface | 0 | −0.10229721 | 0.26279385 | −0.14958795 | 0.04103175 |
| 34 | Fourth aspheric surface | 0 | −0.089026993 | 0.15340881 | −0.064886346 | 0.013833151 |
| 42 | Fifth aspheric surface | 0 | −0.10201444 | 0.023702697 | −0.0044555483 | −0.00030694477 |
| 44 | Sixth aspheric surface | 0 | −0.058282397 | 0.0080708413 | −0.0011444392 | 0.000046453872. |

16. An image acquiring device comprising:
- an image sensor for accepting light from an object of said image acquiring device to generate desired image signals for said object;
- an aperture stop disposed between said object and said image sensor so as to control an amount of said light entering said image acquiring device; and
- a lens set disposed between said aperture stop and said image sensor for treating said entering light from said aperture stop before said entering light reaches said image sensor, said lens set comprising at least three glass-made aspheric lens elements aligned with one another for treatment of said light, a refractive index 'n' of each of two of said at least three glass-made aspheric lens elements satisfying the following requirement: $1.65<n<1.75$.

17. The image acquiring device as claimed in claim 16, wherein the closest one of said at least three glass-made aspheric lens elements to said aperture stop is biconvex, the closest one of said at least three glass-made aspheric lens elements to said imaging sensor has two opposite wavelike surfaces, and another of the rest of said at least three glass-made aspheric lens elements is concavo-convex.

18. The image acquiring device as claimed in claim 16, wherein a distance between the closest one of said at least tree glass-made aspheric lens elements to said aperture stop and the middle one of said at least three glass-made aspheric lens elements is approximately 0.30 mm, a distance between the middle one of said at least three glass-made aspheric lens elements and the closest one of said at least three glass-made aspheric lens elements to said imaging sensor is approximately 0.78 mm.

19. The image acquiring device as claimed in claim 16, wherein an effective focal length of said lens set is 4.809, and a field of view of said lens set is 55.76 degrees.

20. The image acquiring device as claimed in claim 16, wherein a center thickness of the closest one of said at least three glass-made aspheric lens elements to said aperture stop is approximately 0.99 mm, a center thickness of the middle one of said at least three glass-made aspheric lens elements is approximately 0.11 mm, a center thickness of the closest one of said at least three glass-made aspheric lens elements to said imaging sensor is approximately 0.99 mm.

\* \* \* \* \*